United States Patent
Alves et al.

(10) Patent No.: US 7,494,136 B2
(45) Date of Patent: Feb. 24, 2009

(54) BASKET FOR STORING AND TRANSPORTING GOODS IN SHOPS AND OTHER SELLING PREMISES

(75) Inventors: Manuel Alves, Tortosendo (PT); Pedro Dinis, Tortosendo (PT)

(73) Assignee: Joalpe Industria de Expositores, S.A., Tortosendo (PT)

( * ) Notice: Subject to any disclaimer, the term of this patent is extended or adjusted under 35 U.S.C. 154(b) by 0 days.

(21) Appl. No.: 11/862,647

(22) Filed: Sep. 27, 2007

(65) Prior Publication Data
US 2008/0073865 A1 Mar. 27, 2008

(30) Foreign Application Priority Data
Sep. 27, 2006 (FR) .................................. 06 08475

(51) Int. Cl.
*B62B 1/00* (2006.01)
(52) U.S. Cl. .................. 280/33.998; 280/655; 280/639; 280/40; 280/651; 280/33.991; 280/33.995; 280/47.26; 280/641
(58) Field of Classification Search ............ 280/33.998, 280/33.991, 33.997, 33.995, 47.26, 641, 280/655, 639, 40, 651
See application file for complete search history.

(56) References Cited

U.S. PATENT DOCUMENTS

| | | | | |
|---|---|---|---|---|
| 3,677,570 A | * | 7/1972 | Hedu | 280/33.992 |
| 4,185,848 A | * | 1/1980 | Holtz | 280/652 |
| 4,217,711 A | * | 8/1980 | Spresser et al. | 40/308 |
| 4,238,897 A | * | 12/1980 | Byers | 40/650 |
| 4,376,502 A | | 3/1983 | Cohen | |
| 4,765,074 A | * | 8/1988 | Loos | 40/661 |
| 4,765,077 A | * | 8/1988 | Rosenthal et al. | 40/308 |
| 4,773,175 A | * | 9/1988 | Larsen | 40/308 |
| 4,805,331 A | * | 2/1989 | Boggess et al. | 40/651 |
| 4,871,209 A | * | 10/1989 | Handelman | 297/378.1 |
| 5,901,482 A | * | 5/1999 | Sawyer et al. | 40/308 |
| 5,988,334 A | | 11/1999 | Caruso | |
| 6,079,720 A | | 6/2000 | Spear | |
| 6,116,390 A | | 9/2000 | Cohen | |
| 6,179,176 B1 | | 1/2001 | Saggese et al. | |
| 6,193,033 B1 | | 2/2001 | Sadow et al. | |
| 7,147,243 B2 | * | 12/2006 | Kady | 280/655 |
| D544,159 S | * | 6/2007 | McCoy et al. | D32/37 |
| D546,511 S | * | 7/2007 | Luster | D32/37 |
| 2005/0087415 A1 | | 4/2005 | Gorga et al. | |
| 2006/0103087 A1 | | 5/2006 | Alcala et al. | |

FOREIGN PATENT DOCUMENTS

| | | |
|---|---|---|
| EP | 0 780 068 | 6/1997 |
| EP | 1407956 | 4/2004 |
| EP | 1564105 | 8/2005 |
| ES | 1 032 273 | 7/1994 |

* cited by examiner

*Primary Examiner*—Christopher Ellis
*Assistant Examiner*—Cynthia F. Collado
(74) *Attorney, Agent, or Firm*—Egbert Law Offices PLLC

(57) ABSTRACT

The invention relates to a basket, in particular, intended for storing and transporting goods in shops and other selling premises. The basket is formed of a body, including a bottom wall and four lateral walls, castors, and a grasping mechanism. The casters enable the basket to move by rolling over the ground. According to the invention, the grasping mechanism is a telescopic arm deploying from one of the walls of the body of the basket, the one wall being called the proximal wall.

7 Claims, 6 Drawing Sheets

BASKET FOR STORING AND TRANSPORTING GOODS IN SHOPS AND OTHER SELLING PREMISES

CROSS-REFERENCE TO RELATED U.S. APPLICATIONS

Not applicable.

STATEMENT REGARDING FEDERALLY SPONSORED RESEARCH OR DEVELOPMENT

Not applicable.

NAMES OF PARTIES TO A JOINT RESEARCH AGREEMENT

Not applicable.

REFERENCE TO AN APPENDIX SUBMITTED ON COMPACT DISC

Not applicable.

BACKGROUND OF THE INVENTION

1. Field of the Invention

The present invention concerns a basket, in particular intended for storing and transporting goods in shops and other selling premises.

2. Description of Related Art Including Information Disclosed Under 37 CFR 1.97 and 37 CFR 1.98

In the field of the shopping baskets, such as those used in self-service premises, Document EP-1.407.956 divulges a plastic basket, truncated in shape with a rectangular base, pilable and fitted with grab handles enabling to lift it.

This basket exhibits, moreover, a pair of castors, as well as a traction handle, enabling to tow it on the ground while rolling it, in particular along a displacement direction substantially parallel to the longitudinal axis of the basket.

The traction handle of this basket, generally U-shaped, can be deployed in rotation, hinged at the upper edge of the body of the basket, close to a smaller side, and then be folded for resting on the periphery of the upper edge of the body of the basket.

The aim of the present invention is to provide an alternative to the basket mentioned above, the alternative being a trolley type of rolling basket.

Another aim of the present invention is to provide a basket, in particular made of plastic, easy to manufacture, whereof the elements may be easily assembled without any add-on part, such as screws or other similar fastening elements.

Another aim of the invention is to provide a basket including a space dedicated to displaying advertisements. In this space, it will be possible to apply advertisements using so-called "Hot printing" and "In-mould labelling" techniques.

Other aims and advantages of the present invention will appear in the following description which is given solely for illustrative purposes and without being limited thereto.

BRIEF SUMMARY OF THE INVENTION

The invention relates to a basket, in particular intended for storing and transporting goods in shops and other selling premises, formed of a body including a bottom wall and four lateral walls. The basket exhibits, moreover, castors as well as a grasping means enabling the basket to move, while rolling it over the ground. The grasping means consist of a telescopic arm, capable of deploying from one of the lateral walls of the body of the basket, the one lateral wall being called the proximal wall.

BRIEF DESCRIPTION OF THE SEVERAL VIEWS OF THE DRAWINGS

The invention will be understood better using the following description accompanied by the appended drawings.

DETAILED DESCRIPTION OF THE INVENTION

Figure 1:
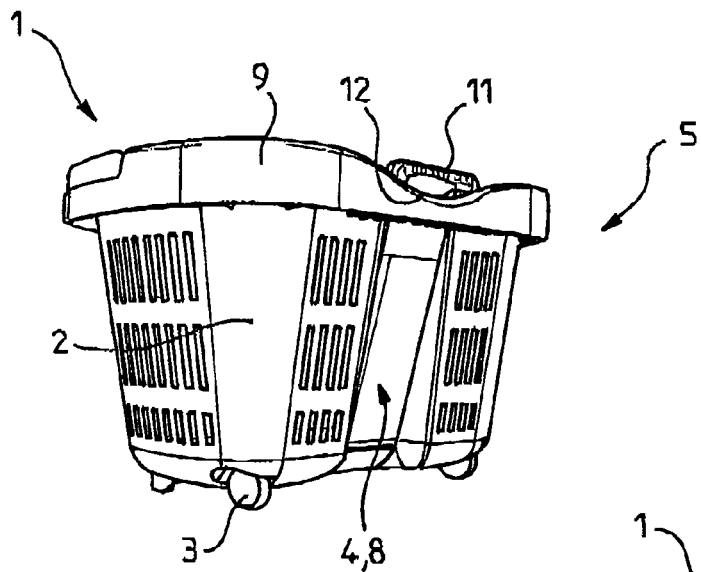
FIG. 1 is a perspective view of a basket according to the invention according to an embodiment with the telescopic arm retracted.
Figure 2:
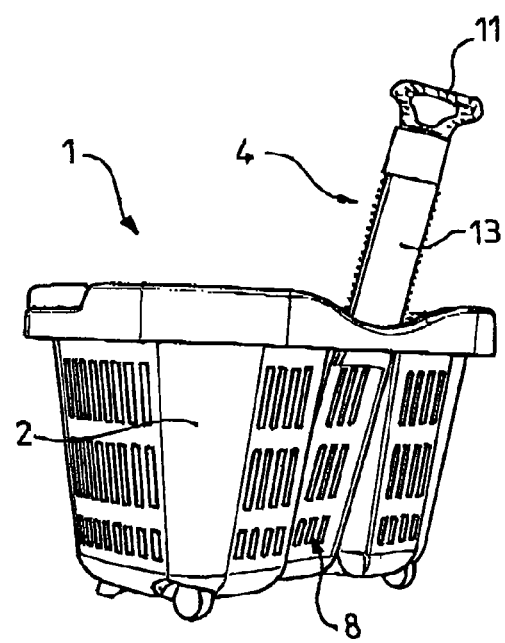
FIG. 2 is a perspective view of the basket as illustrated on FIG. 1, with the telescopic arm in an intermediate deployment position.

The invention relates to a basket 1, in particular intended for storing and transporting goods in shops and other selling surfaces.

The basket is formed of a body 2 including a bottom wall and four lateral walls. In particular, according to the example illustrated, the body 2 of the basket can be globally truncated in shape with a rectangular base, in all or in part punched and made of a plastic material.

The basket exhibits moreover castors 3 as well grasping means enabling the basket to move while rolling it over the ground. Said castors are formed of a cap slaved to a wheel and capable of cooperating with the bottom of the basket.

By castor, a small-sized wheel assembled to the cap is meant. The cap may form a single-piece with the body of the basket or still be formed of a stand-alone element.

According to the invention, the grasping means consist of a telescopic arm 4, capable of deploying, from one of the lateral walls of the body 2 of the basket, the one lateral wall being called the proximal wall 5. The telescopic arm 4 may, in particular, be deployed from the wall of a greater side of the body of the basket.

The body 2 of the basket may exhibit a single pair of castors 3, at the front, close to said proximal wall. The rotational axis of the wheels can be substantially parallel to the greater axis of the basket. The body 2 of the basket may exhibit moreover two level feet 22, at the back.

Advantageously, the proximal wall 5 of the body 2 of the basket may exhibit a wide groove 8 forming, on the one hand, a housing for the telescopic arm 4, when it is retracted, and on the other hand a sliding zone for the arm. This wide groove is in particular median to the proximal wall 5.

Figure 5:
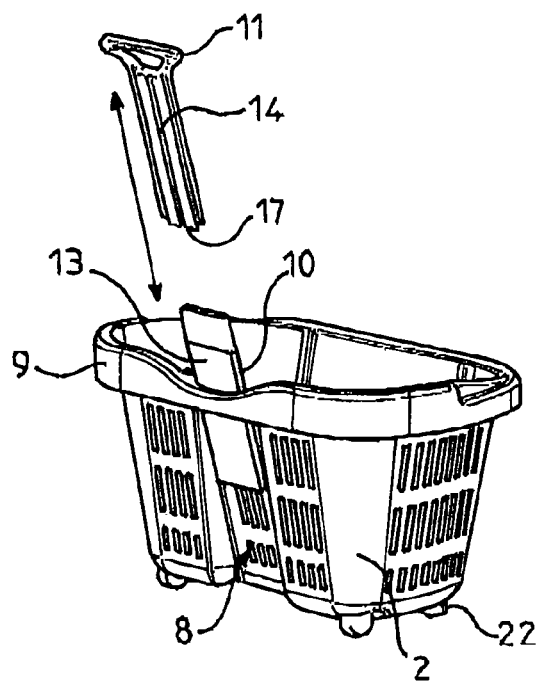
FIGS. 5 and 6 are two schematic views illustrating two steps of the assembly of the basket as illustrated on FIG. 1.
Figure 6:
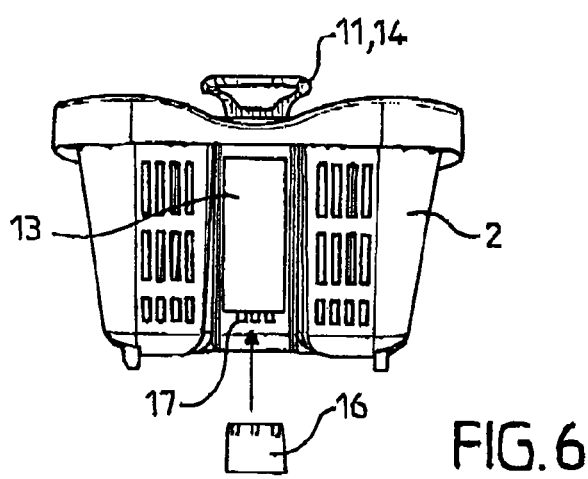
Figure 7:
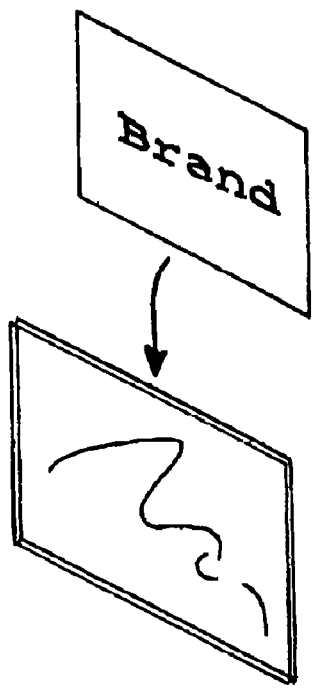
FIG. 7 is a schematic view illustrating a pocket for a tag intended for being attached on the basket.

As illustrated on FIG. 5, the body 2 of the basket may exhibit an upper rim 9, in particular over the whole periphery of the basket, provided with a guiding aperture 10. This guiding aperture 10 is situated in the extension of said wide groove 8.

The guiding aperture 10 is adjusted to the section of the telescopic arm so as to form a resting zone for the arm on the body of the basket, in particular when a user tilts the basket to roll it over the castors 3, at the front. The rim 9 around the opening 10 can be reinforced.

The telescopic arm may exhibit a handle 11. The upper rim 9 of the body of the basket exhibits, on the periphery of the guiding aperture 10, a scalloping 12 enabling the handle 11 to retract in the body of the basket when the telescopic arm 4 is retracted. Also, the telescopic arm 4 and said wide groove 8, as well in particular the scalloping 12, may be sized so that in a retracted position, the telescopic arm 4 does not protrude significantly from the convex enclosure of the body 2 of the basket.

As illustrated, said wide groove 8 may be formed of a recess of the proximal wall 5 in the internal volume of the body 2 of the basket. That way, said wide groove 8, the telescopic arm and in particular the scalloping 12 may be sized so that in the retracted position of the telescopic arm 4, the basket can be piled in another basket of the same type.

Advantageously, such an arrangement improves the visual display of the baskets when stored, as the baskets can only be piled in a single direction, the telescopic arm 4 of the same side of the pile, the recess of a basket cooperating with the wide groove 8 of a superimposed basket.

Figure 11:
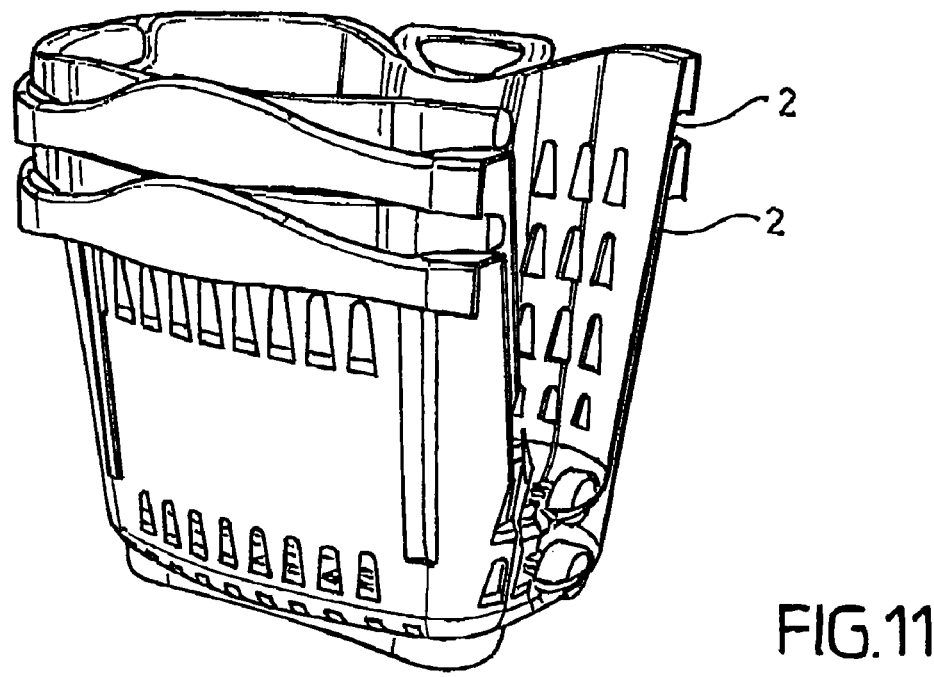
FIG. 11 is a sectional view illustrating the piling up of two baskets according to FIG. 10.
Figure 12:
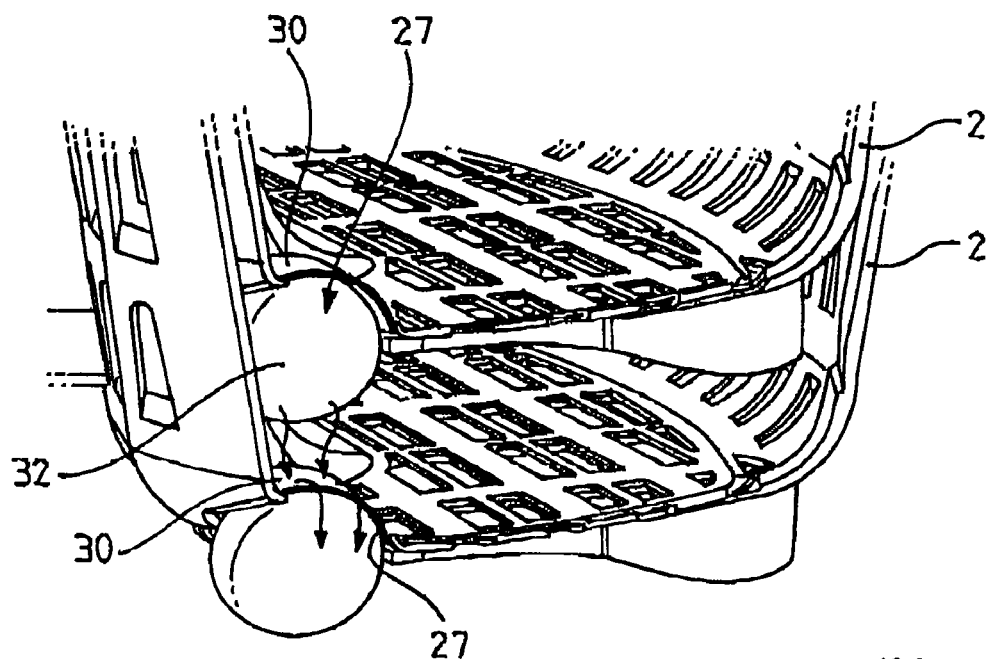
FIG. 12 is a detailed elevation view of FIG. 11, illustrating the castors particularly.

When piled, as illustrated on FIGS. 11 and 12, the wheels of the castors are located on a single side, superimposed relative to one another.

As illustrated on FIGS. 11 and 12, the bottom of the body of the basket may exhibit apertures 27, in particular two in number, enabling prevention of the accumulation of smears from the wheels of a superimposed basket. These apertures may be provided on the cap 30 of the castors, as a single piece with the body of the basket.

Advantageously, this aperture 27 is lateral to the wheel, on the external side of the basket. When two baskets are piled, as illustrated on FIG. 12, the smear of the wheel 32 of the upper basket falls by gravity on the top of the cap of the lower basket. The top of the cap 30 is slightly tilted so that the smear slides and is evacuated by gravity through the lateral opening 27.

The telescopic arm 4 may be formed, at least partially, if a sheath 13 accommodating an elongated element 14 exhibits a handle 11 at the proximal end thereof.

The arm 4 may include a blocking insert 6, whereof the function will be defined therebelow. This insert 6 may be slaved to the distal end of the elongated element in particular via snap-on means 24, i.e. clips between both its elements. The joining piece 10, the sheath 13 and the elongated element 14 may be fully made of plastic material.

The sheath 13 is a tubular guide, exhibiting an upper aperture enabling insertion of the elongated element 14 and, in particular, a lower aperture enabling insertion of the blocking insert 16 so as to attach to the element 14.

The telescopic arm 4 may be deployed in translation according to a double sliding, between on the one hand, the elongated element 14 and the sheath 13, and on the other hand, between the sheath 13 and the body 2 of the basket.

Figure 4:
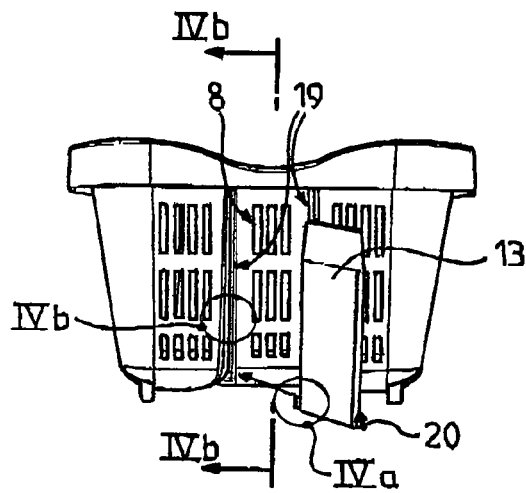
FIG. 4 is a front elevation view of the body of the basket as illustrated on FIG. 1, having an element of the telescopic arm is assembled inside the body.
Figure 4B:
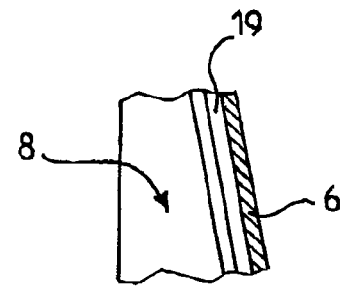
FIG. 4*b* is a cross-sectional view along section IVb as illustrated on FIG. 4.
Figure 4A:
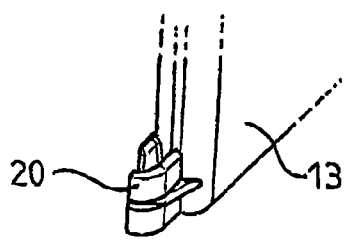
FIG. 4*a* is a perspective view of a detail of an element of the telescopic arm.

The bottom of the wide groove 8 of the body 2 of the basket may be fitted with two guiding slots 19 as illustrated at FIG. 4. The telescopic arm 4, in particular, the sheath 13, then exhibits two lateral projections 20 intended for cooperating in translation with said slots 19.

Advantageously, the blocking insert 16 may be embedded by the snap-on means at the distal end 17 of the elongated element 13. The upper end of the sheath 13 then exhibits a reduced section 15. The blocking insert 16 enables limitation of the relative stroke between the sheath 13 and the elongated element 14 while abutting against said reduced section 15.

Figure 9:
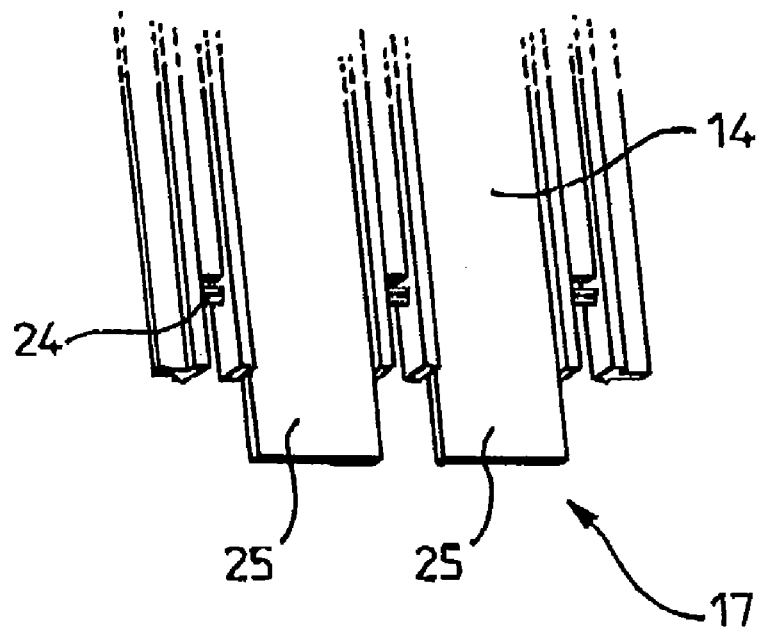
FIG. 9 is a detailed schematic view illustrating the mechanical link between two elements of the telescopic arm.
Figure 9:
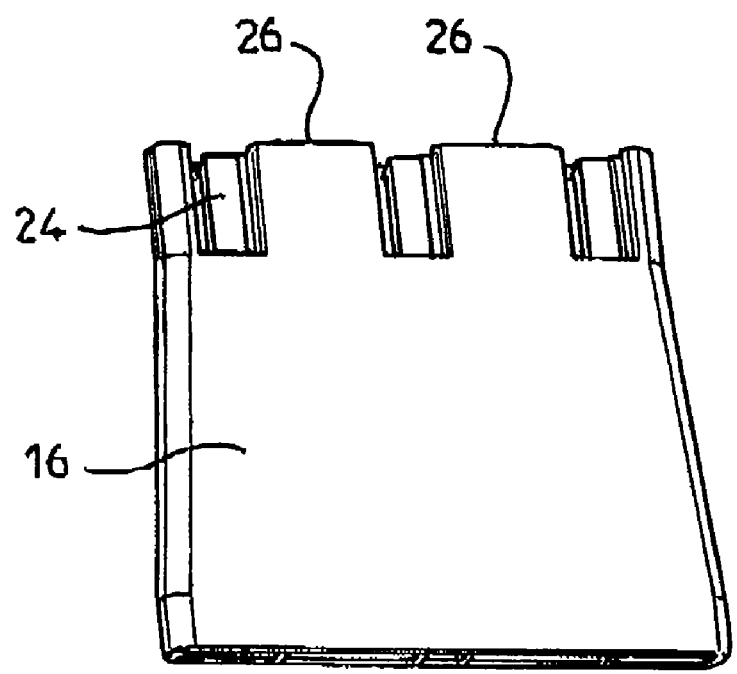

Moreover, as illustrated on FIG. 9, the joining piece 16 and the element 14 may be provided with interlocking means 25, 26 enabling strengthening of the mechanical link between both its elements.

In particular, the elongated element 14 may exhibit male portions 25 adjusted for engaging by nesting with female portions of the element 16, or conversely.

Figure 10:
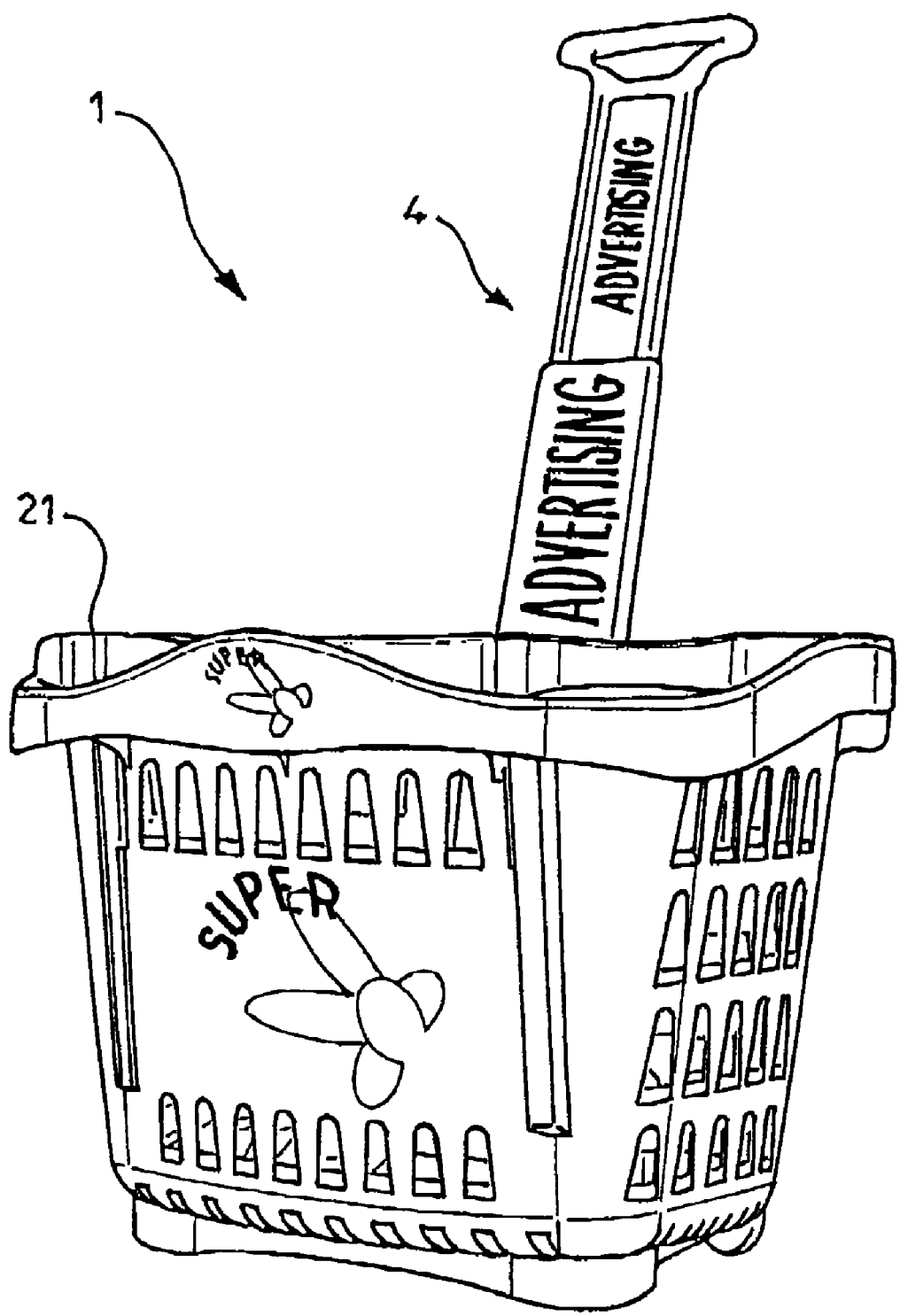
FIG. 10 is a perspective view of a basket according to the invention according to a second embodiment with the telescopic arm deployed.

The telescopic arm 4 may be made fully of plastic material and may be used, as illustrated on FIG. 10 for an advertising medium, in particular using so-called <<Hot printing >> and/or <<In mould labelling >> techniques.

Figure 3:
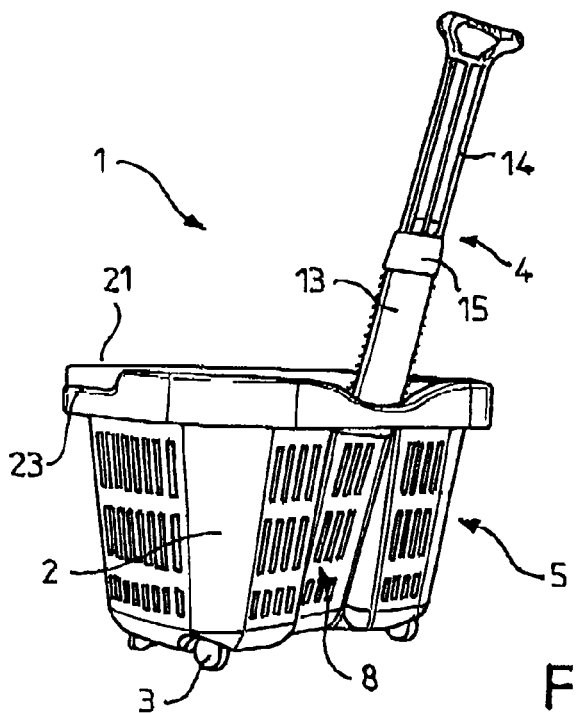
FIG. 3 is a perspective view of the basket as illustrated on FIG. 1, with the telescopic arm fully deployed.

Besides, the basket 1 may exhibit a grab handle 21 enabling to lift it, said grab handle 21 being hinged to the body of the basket 2. The generally U-shaped grab handle may join both smaller sides of the basket. It may be deployed over 90° enabling the basket to be lifted and be folded for resting on the upper edge of the basket 9, in particular, in a recess 23 provided to that end. This recess may be situated on the external semi-periphery of the upper edge, opposite to the telescopic arm 4, as illustrated on FIG. 3.

According to another embodiment of the basket illustrated on FIGS. 10 to 12, the grab handle 21 may be folded back on the upper edge of the basket, inside said basket.

According to an embodiment, the body of the basket may exhibit a space dedicated for displaying advertisements. This space is situated advantageously on the distal wall 6 of the body of the basket. In this space, it will be possible in particular to apply advertisements using so-called "Hot printing" and "In-mould labelling" techniques. The advertisement will be particularly visible when a user tilts the basket to roll it.

Figure 8:
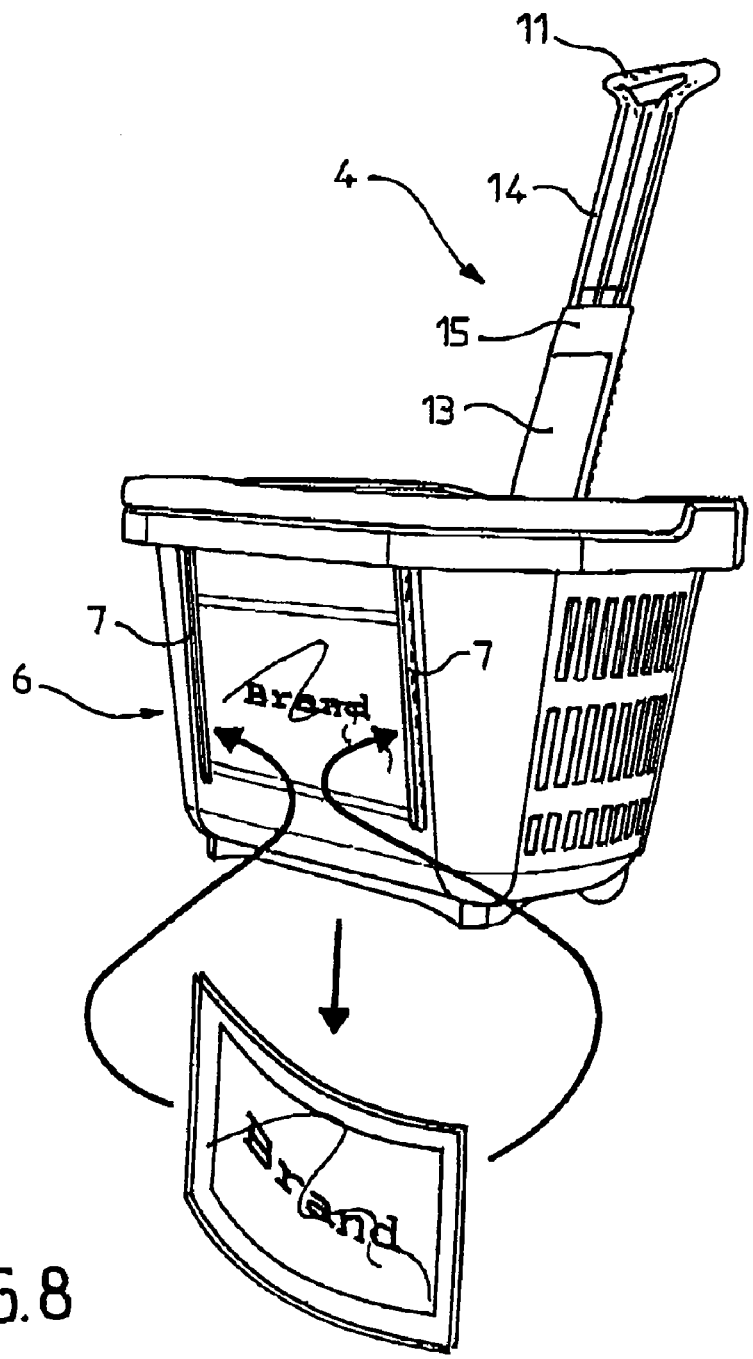
FIG. 8 is a schematic view illustrating the distal wall of the basket whereon the tag is fastened as illustrated on FIG. 7.

As illustrated, according to the embodiment of FIG. 8 or 10, the distal wall 6 of the body 2 of the basket is massive, not punched, at least partially provided in particular to form a supporting surface for advertising tags/posters. Said distal wall 6 of the body of the basket may exhibit, moreover, two grooves 7 arranged opposite to one another, parallel to one another, vertical or horizontal, enabling to hold a tag/poster by two opposite edges.

Each groove 7 may be formed at a lip protruding to the outside of the distal wall 6 of the body of the basket. As illustrated on FIG. 8, the grooves may be vertical, the tag, in particular inserted in a clear plastic pocket, being simply folded for inserting its edges into said grooves.

The basket may be provided almost fully in plastic material and be assembled without any added elements such as screws or the like. In particular, according to the embodiment illustrated in the figures, the telescopic arm 4 may be assembled to the body 2 of the basket as follows:

inserting the sheath 13 into the wide groove 8, the lateral projections 20 being engaged in the guiding slots 19 of the body 2 of the basket;

introducing the elongated element 14 by the guiding aperture 10 inside the sheath 13, and translation downwards of the element 14; and embedding the blocking element 16 on the distal end 16 of the elongated element 14, the element 16 being inserted in the sheath through its lower aperture.

The castors 3 may be of plastic material and exhibit their own axis of rotation, in particular being made of metal. The axis of the castors may be embedded in reservations provided to that end below the bottom wall of the basket.

The various elements of the basket, except for the castors, may be realized out of plastic material by the injection-moulding techniques.

Naturally, other embodiments, understandable to the man of the art, could have been contemplated without departing from the framework of the invention, defined by the claims below.

We claim:

1. A basket apparatus for storing and transporting goods comprising:
   a body having a bottom and four lateral walls extending upwardly therefrom;
   a plurality of casters affixed to said bottom of said body;
   a grasping means for moving the body by rolling said plurality of casters on an underlying surface, said grasping means comprising a telescopic arm extending from a proximal wall of said lateral walls, said telescopic arm movable between a retracted position to an extended position, said proximal wall having a wide groove defining a housing for said telescopic arm when said telescopic arm is in said retracted position, said wide groove defining a sliding zone for said telescopic arm, said telescopic arm comprising:
   an elongated element;
   a sheath receiving said elongated element therein;
   a handle affixed to an end of said elongated element, said telescopic arm having a double sliding motion in which said elongated element slides relative to said sheath and in which said sheath slides relative to said body, said sheath having an upper end with a reduced section; and
   a blocking insert embedded in an end of said elongated element opposite said handle, said blocking element limiting the sliding of said elongated element relative to said sheath, said blocking insert abutting against said reduced section.

2. The basket apparatus of claim 1, said body having an upper rim with a guiding aperture, said guiding aperture extending from said wide groove.

3. The basket apparatus of claim 2, said upper rim of said body having a scalloping on a periphery of said guiding aperture.

4. The basket apparatus of claim 2, said wide groove formed in a recess in said proximal wall in an internal volume of said body.

5. The basket apparatus of claim 1, said plurality of casters comprising a single pair of casters positioned at a front of said body, the basket apparatus further comprising:
   a pair of level feet affixed at a back of said body.

6. The basket apparatus of claim 1, further comprising:
   a grab handle hingedly connected to said body.

7. The basket apparatus of claim 1, said four lateral walls having a distal wall with a support surface thereon suitable for receiving an advertising display thereon, said support surface having a pair of slots arranged opposite to each other.

\* \* \* \* \*